3,260,466
FISSILE FUEL RECOVERY PROCESS
Jean I. Wagner, Huntington, Robert M. Singer and Donald G. Schweitzer, East Islip, and Herbert M. Katz, Port Jefferson, N.Y., assignors to the United States of America as represented by the United States Atomic Energy Commission
No Drawing. Filed Nov. 26, 1963, Ser. No. 326,300
2 Claims. (Cl. 241—1)

This invention is related to the recovery of fissile fuel values from spent pyrolitic carbon coated fissile fuel containing bodies. More particularly this invention is related to a process for rupturing the pyrolytic carbon coatings on pyrolytic carbon coated fissile material bearing cores.

It has been proposed to construct cores of nuclear reactors in particular fluidized nuclear powered reactors, out of shaped bodies of fissile fuels coated with pyrolytic carbon.

Pyrolytic carbon is a carbon compound similar in chemical composition to graphite but is not structurally akin to graphite. Graphite is essentially two dimensional in that it has substantially flat layer planes where the C—C bond difference is much smaller in the planes than it is between the planes. Thus Lamellar compounds (graphite compounds with other materials) are readily formed or introduced between the planes causing the delamination of graphite. On the other hand pyrolytic carbon which generally does not have the ideal spacing, has layers which are turbostratic with respect to each other and many more carbon atom cross linkages exist between the layers than exist between the layers of graphite, thus rendering it far more difficult to introduce Lamellar compounds into pyrolytic carbon materials. The "C" axis value (distance between layer planes) as measured by X-ray in graphite is $K_x$ 6.72, whereas if it is appreciably larger, is not completely graphitic.

Pyrolytic carbon is an amorphous form of the element carbon in which crystallites are small (about 25 A. across), randomly oriented and turbostatic in layer arrangement. In other words, they are made up of randomly aligned small stacks of parallel, but randomly rotated graphitic planes. Methods of preparation and properties of such materials are more fully described in an article by Claude A. Klein, entitled "Pyrolytic Graphite" published in the August 1962 issue of International Science and Technology at pages 60 through 68.

Pyrolytic carbon is relatively impervious to attack from chemical reagents and is utilized as a coating on uranium dicarbide spheres to provide an impermeable mechanically tough protective coating on the spheres. After such spheres are spent having been employed in forming the core of a nuclear power reactor, there remains much unexpended uranium which must be recovered from the spheres to render power production from such a source economical. However the properties such as resistance to chemical attack and impermeability which favor the selection of pyrolytic carbon as a protective coating in the production of the spheres have tended to militate against its use because these very properties increase enormously the cost of recovering unspent uranium values from the spheres after they have been utilized in a nuclear power reactor.

The method previously examined and proposed by the art for recovering the uranium values from such pyrolytic carbon coated spheres has been to mechanically crush the spheres in order to fracture the pyrolytic carbon coating in order to expose the uranium values contained in the cores. Thereafter the exposed uranium values are then removed from the core by dissolving them in nitric acid or some other conventional recovery process. Rupturing of the coatings requires the use of mechanical crushers which must be remotely controlled because of the inherent radioactivity of the materials. Such remote controlled mechanical equipment is very expensive as well as difficult and costly to maintain and repair.

The object of this invention is to provide a highly efficient and economical method of recovering fissile fuel values from spent pyrolytic carbon coated fissile fuel elements.

We have unexpectedly discovered that pyrolytic carbon coatings on spent pyrolytic carbon coated fissile material bearing nuclear fuel elements can be ruptured by the passage of electrical energy through the coated particles. The amount of electrical energy required to rupture the pyrolytic coatings will vary with the thickness of the coatings. For example, pyrolytic carbon coatings of about 25 microns in thickness on uranium dicarbide spheroids, the coated spheroids having an outside diameter of approximately about 140 microns were ruptured by the application of electrical energy through the spheroids of about 45 volt amperes. Of course larger energy levels would be required in the case of particles having thicker coatings.

The electrical energy passed through the particles in practice of our invention can be applied to the particles in a gaseous environment such as air or in a liquid environment such as aqueous nitric acid, ammonium nitrate, etc. Of course when a gaseous environment such as air is utilized a high voltage is necessary to cause passage of the electrical energy through the environment and a low current can be utilized. When a liquid environment is utilized with the liquid having a relatively low resistance in comparison with air a high current with a low voltage can be employed to effectuate rupturing of the pyrolytic carbon coating on the particles. The length of time required to rupture the pyrolytic carbon coatings will of course be directly related to the amount and rate of application of electrical energy applied to the coated particles.

Any conventional means capable of passing electrical energy through particles may be employed in the practice of our invention. The rupturing of the pyrolytic carbon coatings on the particle can be visually observed. Upon rupture of the coating the fissile material bearing core becomes readily available for conventional fissile material recovery processes, e.g. liquid and gaseous recovery processes which recovery processes are well known to those skilled in the art.

By fissile material bearing cores used in this invention is meant conventional fissile nuclear fuel elements as well as spent fissile nuclear fuel elements e.g., uranium, thorium, plutonium, mixtures thereof as well as monocarbides and dicarbides thereof.

*Example 1*

6.2 milligrams of uranium dicarbide spheroids having a pyrolytic carbon coating of approximately 25 microns in thickness and an average outside diameter of 140 microns were placed on a standard porous Pyrex glass frit approximately 2 mm. thick. The frit was fixedly positioned by welding in the arm of a U shaped tube having a diameter of about 10 mm. A liquid 4 molar aqueous solution of nitric acid was introduced into the tube in an amount such that the level of the nitric acid solution was even with the bottom surface of the frit. Air was sparged through the U shaped tube against the particles on the frit causing the nitric acid solution to bubble and wet the particles when the ntiric acid back-flowed against the frit.

A flat spiral shaped platinum wire electrode aligned with the frit was placed approximately 1 mm. above the spheroids which had been spread in a layer over the surface of the frit having a thickness of approximately 140 microns. A flat rectangular shaped tantalum wire grid electrode was placed approximately 1.5 cm. from the spiral electrode on the opposite side of the frit. A Tesla type high voltage A.C. transformer which had been previously adjusted to provide a spark length of 2 cm. in air from its output electrode to ground (approximately 10,000 to 20,000 volts) was connected to the spiral electrode. The grid electrode was grounded. The electrical output of the transformer was passed through the wet spheroids for approximately 2½ minutes. Many sparks jumped from the electrodes to the spheroids.

Thereafter, a solution of 4 molar aqueous nitric acid having a temperature of about 35° C. was circulated through the spheroids on the frit for about 2 hours. Analysis of the 4 molar nitric acid solution which had been circulated and diluted to 200 ml. showed 0.05 microgram of uranium per milliliter. The percentage of recovery of uranium from these spheroids was determined to be 2.5%.

In contrast to the result obtained in this example, less than 1/10% recovery of uranium from similar spheroids was achieved when these spheroids were continuously contacted for longer periods of time at higher temperatures with 16 molar aqueous nitric acid solution and 1 molar aqueous nitric acid solution without the passage of electrical energy through the spheroids.

The electrically contacted spheroids were removed from the frit after having been in contact with nitric acid and were examined under a microscope for evidence of rupturing. A microscopic examination of these spheroids showed that many of the spheroids had coatings which showed evidence of severe rupturing. The coatings of spheroids which had been bathed in aqueous nitric acid solution without prior application of electrical energy were found to be intact with none of those spheroids showing ruptured coatings. Thus it is readily apparent to any one skilled in the art that our process provides those skilled in the art wth an efficient, easy operable method of rupturing pyrolytic carbon coatings on fissile nuclear fuel particles. It must be borne in mind that the illustration of our example given in Example I is intended merely to show the operability of our process, to wit, the rupturing of pyrolytic carbon coatings by the application of electrical energy thereto and is not intended to be illustrative of a process for recovering core materials. Processes for recovery of such core materials are well known to those skilled in the art. Obviously the core material could be recovered by a gaseous fluorination method or by other conventional methods once the pyrolytic carbon coating is ruptured.

*Example II*

An apparatus similar to Example I was used wherein the grid electrode was moved back into the arm of the U tube opposite the arm containing the frit. The spiral electrode was placed directly in contact with the spheroids. A solution of 16 molar aqueous nitric acid solution was passed through the U tube flowing through the top of the frit with both electrodes being immersed in the solution of electrolyte. 1.8 mgs. of uranium dicarbide spheroids of the type used in Example I were placed on the frit. The spiral electrode was utilized as the anode and a current density of 0.6 ampere per sq. centimeter passed upon the surface area of the spiral electrode and spheroids with a voltage of about 90 volts D.C. was passed through the particle for 4 hours with continuous recirculation of the nitric acid solution having a temperature of about 80° C. The percentage of uranium recovery was determined to be 100%.

A microscopic examination of the remains of the spheroids showed that the residue consisted of fractional coatings from which the core matter had been eaten out. From visual examination it was noted that the coatings had actually ruptured and had not appeared to have undergone a uniform extensive chemical oxidation.

From the above description and examples given herein it is obvious to one skilled in the art that our novel process is readily adaptable to use as either a batch or continuous type process in which contamination of equipment and remote handling are sharply reduced in comparison to conventional processes such as crushing, thus sharply reducing recovery costs. It will be obvious to those skilled in the art that our novel process is readily adaptable for use as either a continuous or batch type process.

Having described our invention, what we claim as new and desire to secure by Letters Patent is:

1. A process for rupturing the pyrolytic coatings on pyrolytic carbon coated fissile material bearing nuclear fuel elements comprising, applying electrical energy to the surface of said elements and causing said energy to pass through said elements in an amount greater than 45 volt amperes, said electrical energy having a current density of about 0.6 ampere per sq. centimeter.

2. The process of claim 1 wherein said electrical energy is applied to said elements in an electrically conductive aqueous environment.

References Cited by the Examiner

Culler et al.: "Dissolution and Feed Preparation for Aqueous Radiochemical Separation Processes," vol. 17, 2nd United Nations International Conference of Peaceful Uses of Atomic Energy, page 263.

L. DEWAYNE RUTLEDGE, *Primary Examiner.*

BENJAMIN R. PADGETT, *Examiner.*

S. TRAUB, *Assistant Examiner.*